March 25, 1958  R. C. PORTER  2,828,120
APPARATUS FOR RECONDITIONING WELDED PIPE FLANGES, PREPARING
THE ENDS OF PIPE FOR WELDING TO PIPE FLANGES
OR OTHER LENGTHS OF PIPE Filed Aug. 13, 1953  7 Sheets-Sheet 1

INVENTOR.
Raymond C. Porter
BY Gerald B. Tjoflat
His Attorney

March 25, 1958 R. C. PORTER 2,828,120
APPARATUS FOR RECONDITIONING WELDED PIPE FLANGES, PREPARING
THE ENDS OF PIPE FOR WELDING TO PIPE FLANGES
OR OTHER LENGTHS OF PIPE
Filed Aug. 13, 1953 7 Sheets-Sheet 2

March 25, 1958  R. C. PORTER  2,828,120
APPARATUS FOR RECONDITIONING WELDED PIPE FLANGES, PREPARING
THE ENDS OF PIPE FOR WELDING TO PIPE FLANGES
OR OTHER LENGTHS OF PIPE
Filed Aug. 13, 1953  7 Sheets-Sheet 3

INVENTOR.
Raymond C. Porter
BY Gerald B. Tjoflat
His Attorney

March 25, 1958 R. C. PORTER 2,828,120
APPARATUS FOR RECONDITIONING WELDED PIPE FLANGES, PREPARING
THE ENDS OF PIPE FOR WELDING TO PIPE FLANGES
OR OTHER LENGTHS OF PIPE
Filed Aug. 13, 1953 7 Sheets-Sheet 5

INVENTOR.
Raymond C. Porter
BY Gerald B. Tjoflat
His attorney

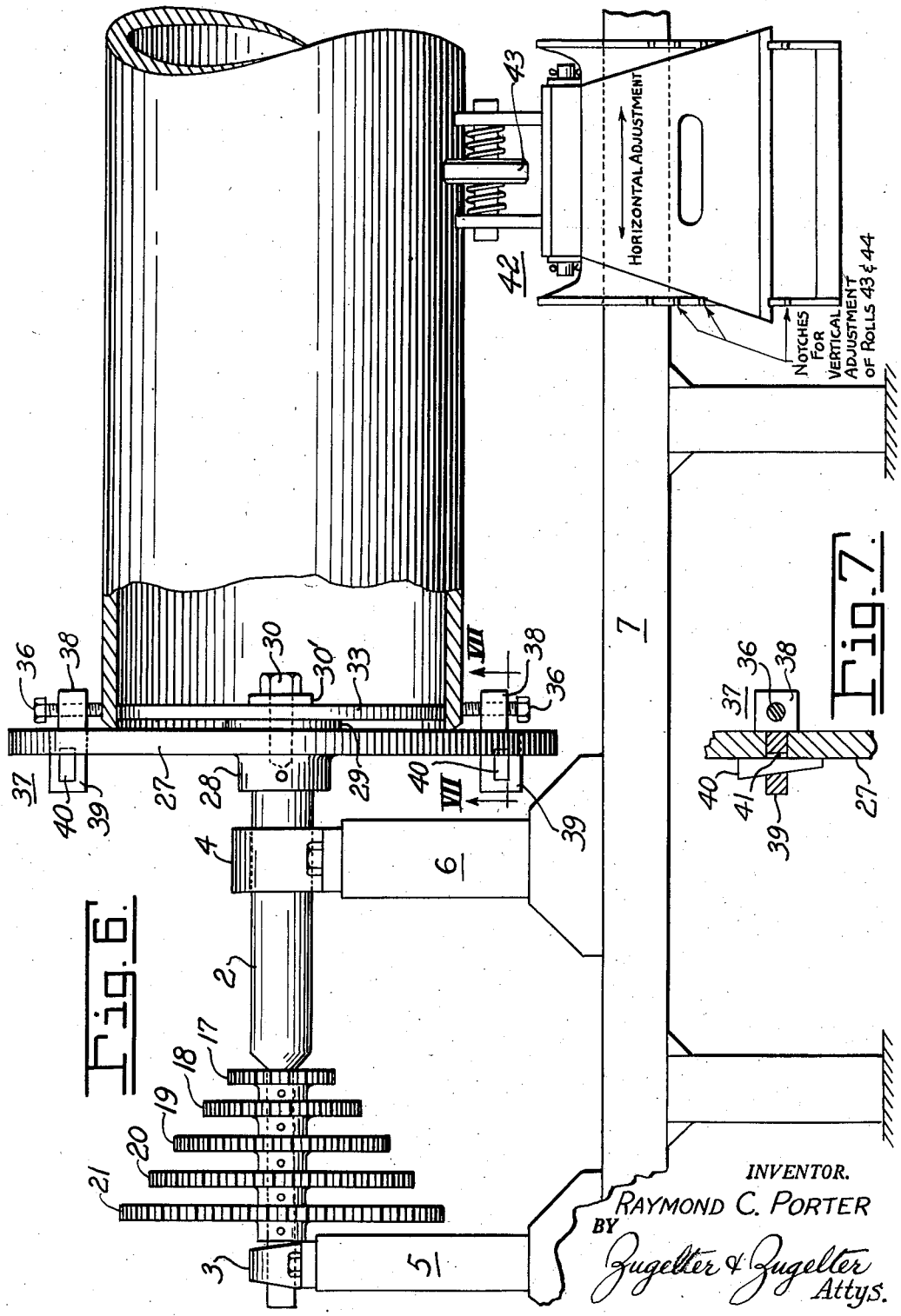

March 25, 1958 R. C. PORTER 2,828,120
APPARATUS FOR RECONDITIONING WELDED PIPE FLANGES, PREPARING
THE ENDS OF PIPE FOR WELDING TO PIPE FLANGES
OR OTHER LENGTHS OF PIPE
Filed Aug. 13, 1953 7 Sheets-Sheet 7
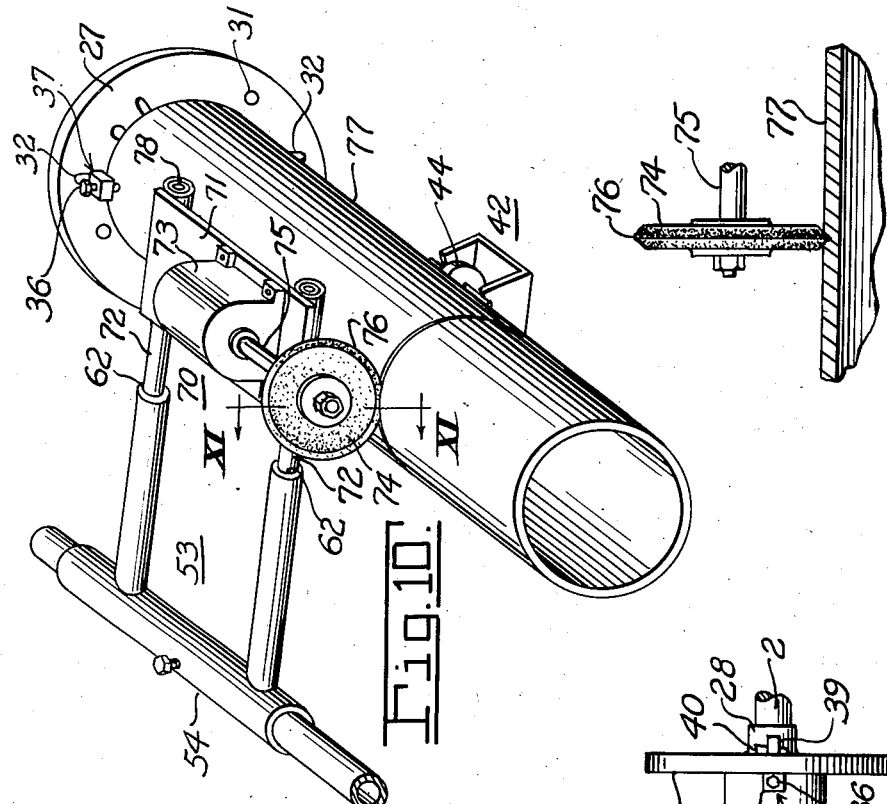
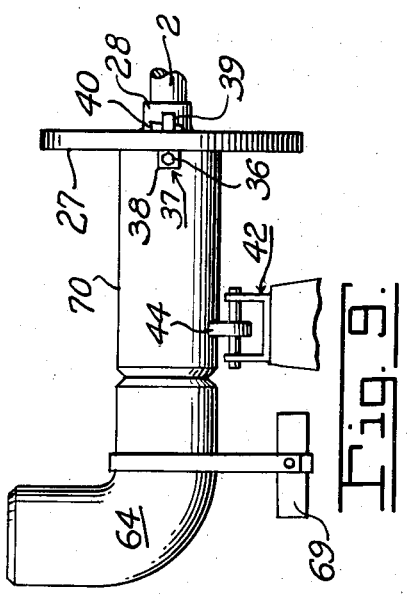
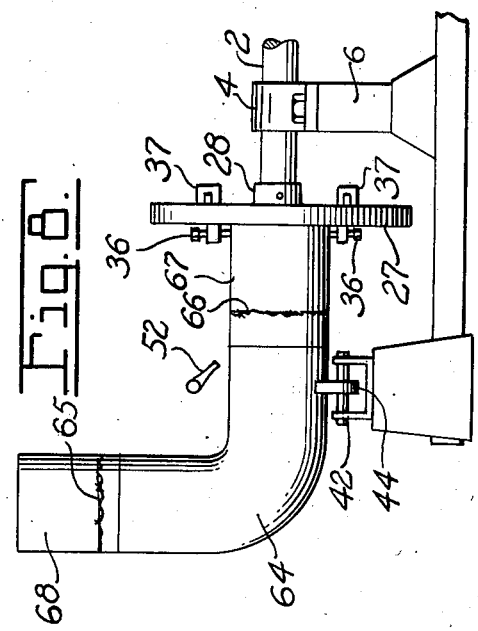
INVENTOR.
RAYMOND C. PORTER
BY
Zugelter & Zugelter
Attys.

United States Patent Office 2,828,120
Patented Mar. 25, 1958

2,828,120

APPARATUS FOR RECONDITIONING WELDED PIPE FLANGES, PREPARING THE ENDS OF PIPE FOR WELDING TO PIPE FLANGES OR OTHER LENGTHS OF PIPE

Raymond C. Porter, Cincinnati, Ohio

Application August 13, 1953, Serial No. 374,054

3 Claims. (Cl. 266—23)

This invention relates to welding and cutting of pipe, flanges and the like, and more particularly to a method of an apparatus for welding pipe to pipe, pipe to pipe flanges, reconditioning and reclaiming pipe flanges for re-use, and the like.

In the construction of piping systems for chemical plants, steam boiler plants and the like, it is often necessary to reclaim pipe flanges and to provide the proper angle of bevel on the short pipe section of the flange, in order that it may be welded to a pipe in accordance with strict standards and specifications for such work. It is also necessary to properly bevel the ends of pipe which are to be welded to other pipe or to pipe flanges.

Heretofore, it has been customary to reclaim such pipe flanges and to restore the bevel thereon by slow and time-consuming machine shop operations. This has also been true of pipe, the practice having been to cut the pipe to length, and then turn the bevel at the ends of the pipe to the proper angle. Such operations are costly and time-consuming.

An object of this invention is to provide a method whereby pipe flanges may be reclaimed by removing any ragged pipe portion or unusable pipe portion at or near the original fusion line of the weld, and thereby restore the original bevel on the flange.

Another object of the invention is to provide a method whereby such pipe flanges may be reclaimed at the site of the work, without putting them in a lathe or other suitable machine to cut and turn the same to the proper bevel.

Another object of the invention is to provide a method whereby pipe may be cut to length and the ends thereof beveled without resorting to the use of machine shop apparatus, and which may be cut and beveled at the site of the work at a substantial saving in labor cost and time.

A still further object of the invention is to provide a method whereby pipe flanges and pipe having abutting beveled ends, may be accurately supported about a common axis and the abutting ends welded with a uniform deposit of weld metal around the entire joint, thereby avoiding warping of the pipes at the joint.

A still further object of the invention is to provide a machine having a face plate, to which a pipe flange or the end of a pipe may be secured and supported accurately with respect to the axis of rotation of the face plate, to provide for torch cutting of the required bevel on the ends of the pipe, and also to accurately torch-cut the bevel on a pipe flange.

A still further object of the invention is to provide a machine of the type set forth above, in which a wide range of sizes of pipe flanges and pipe may be handled, said range varying from, for example, pipe diameters of one and one-half inches, and correspondingly sized flanges to pipe diameters of, say, thirty inches, with correspondingly sized flanges.

A still further object of the invention is to provide a machine of the type set forth in the preceding object, that is not subjected to that material injury from the heat of cutting torches, and that such parts as may be exposed to the heat of the cutting torch, may be made inexpensively and replaced as consuming parts, at nominal cost, without tying up the machine for repairs to any principal or critically important component part of the machine.

Other objects of the invention will be apparent to those of ordinary skill in the art to which the invention pertains, from the following description taken in conjunction with the accompanying drawings.

In the drawings:

Fig. 6 is an enlarged view in elevation showing a pipe attached to the face plate, and supported by the cradle support rolls;

Fig. 7 is a view in section taken on line VII—VII of Fig. 6, showing a detail embodied in the machine for securing pipe to the face plate;

Fig. 8 is a partial view, in elevation, of the machine, showing a set-up for reclaiming elbows;

Fig. 9 is a view in elevation, similar to Fig. 8, showing a set-up for welding a pipe to an elbow;

Fig. 10 is a view in perspective, showing an abrasive wheel for cutting alloy pipe that cannot be cut by a torch; and Fig. 11 is a view in elevation partly in section, showing an edge view of the abrasive wheel and a portion of the pipe being cut, the view being in the plane of line XI—XI of Fig. 10.

Figure 1:
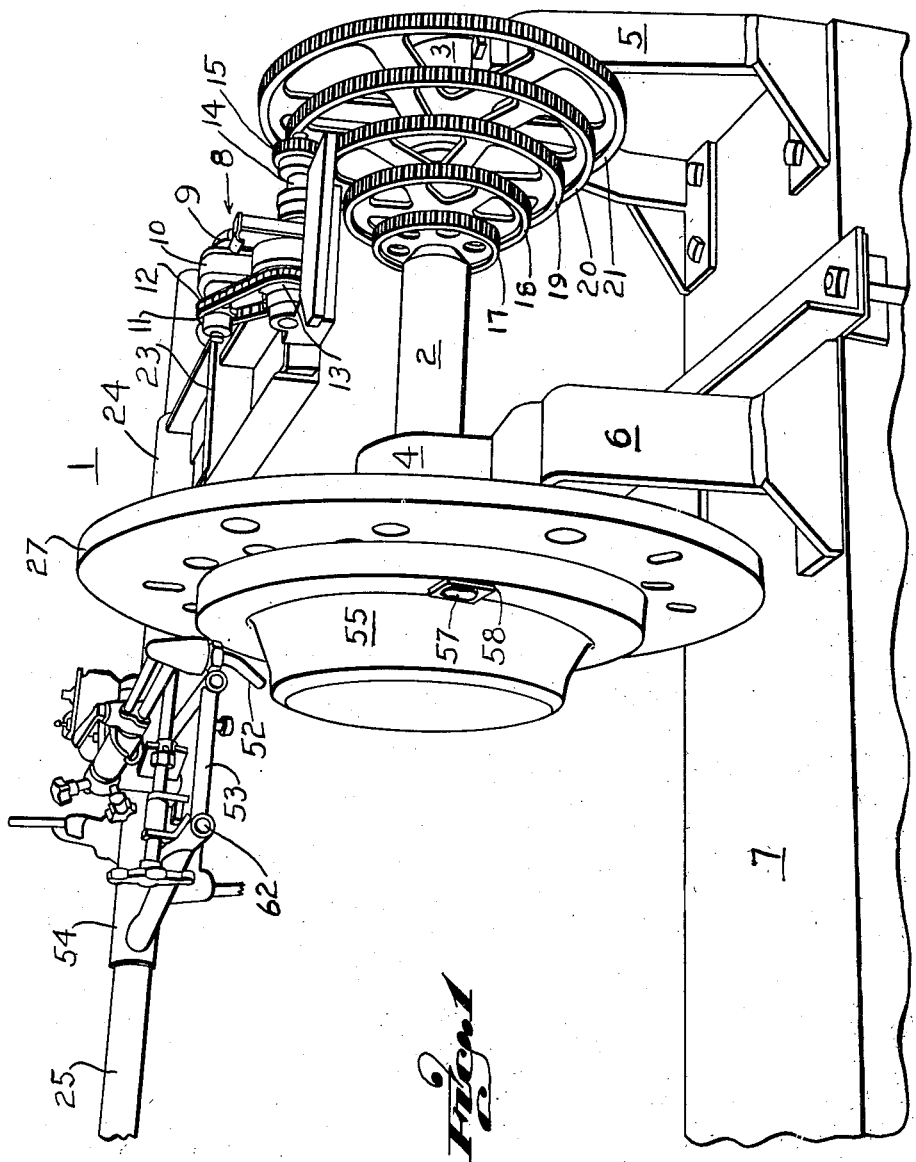
Figure 1 is a view in perspective of a machine having a face plate arranged and constructed in accordance with an embodiment of the invention, and by means of which the method of this invention may be performed.

In Fig. 1 of the drawings is illustrated a machine 1, which now appears to embody a preferred form of the invention. Machine 1 comprises a shaft 2, mounted in bearings 3 and 4, carried by bearing supports 5 and 6, respectively. The supports 5 and 6 are mounted on a bed 7 of the machine.

The shaft 2 is provided with means 8 for rotating the same in its bearings. As illustrated, the means comprises a motor 9, a gear reducer 10, the output pinion 11 of which is connected by a sprocket chain 12 to a gear 13, mounted on a jack shaft 14. The jack shaft 14 is provided with a pinion 15, adapted to have driving engagement with a selected gear of a set of gears 17, 18, 19, 20 and 21, mounted on and secured to shaft 2. The motor 10, the gear-reducing unit 11, the pinion 12, and jack shaft 14, are carried by a frame 23, having a sleeve 24 thereon that is slidably and rotatably mounted on a tubular support member 25. By means of the frame 23 and sleeve 24, the motor unit 9 and the jack shaft 14, with the other parts of the motor drive, may be moved along member 25 and, at the same time, rotated thereon to raise or lower the pinion 15 as required, to engage the selected gear of the group of gears 17 through 21, inclusive. By means of this motor drive and gear arrangement, shaft 2 may be driven at selected speeds.

The end of shaft 2, supported in bearing 4, extends outboard of that bearing and is provided with a face plate 27. The center of the face plate 27 is provided with a round hole for receiving the end of shaft 2. The back of the face plate has a hub 28, by which it is secured to shaft 2. The portion of shaft 2 which extends through plate 27 is reduced in diameter to accommodate a spacer plate 29 (see Fig. 6) and drilled and tapped to receive a cap screw 30, the head of which bears against a washer 30'.

Figure 2:
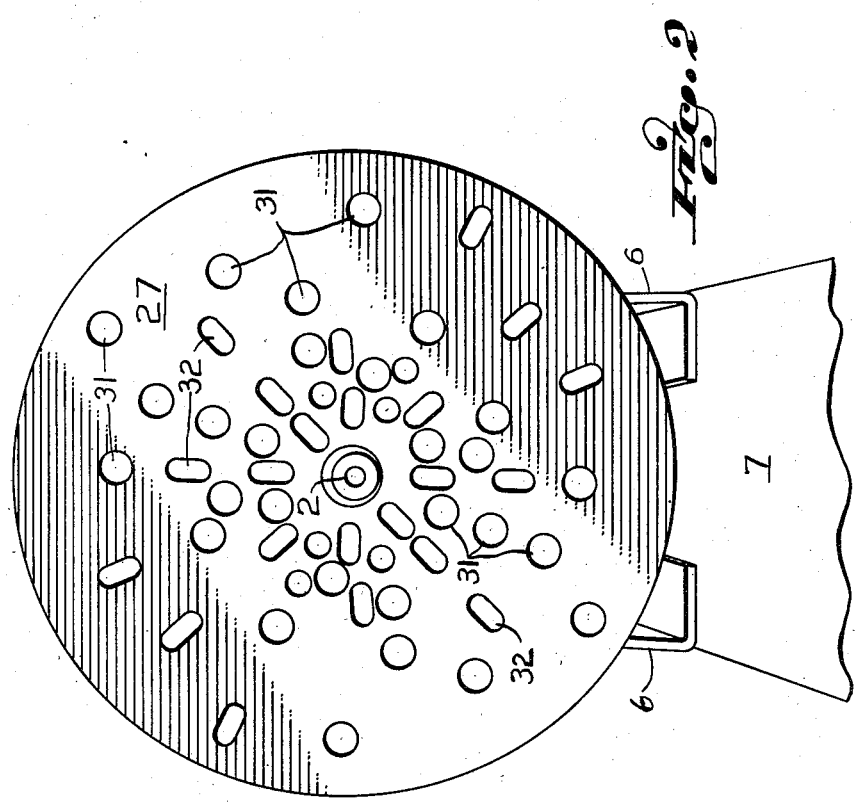
Fig. 2 is a view in front elevation of the face plate shown in Fig. 1.

The face plate, as illustrated in Fig. 2, is provided with a plurality of apertures, the spacing of which is so arranged that pipe flanges and pipe may be secured to it. The sizes of the pipe and flanges may range from, say, one and one-half inches up to the diameter of the face plate which may, for example, be thirty inches more or less. The apertures in the face plate, as shown, are arranged in pairs, one on each side of the center of rotation of the face plate; that is, the apertures of a pair are disposed on a diameter of the face plate. The face plate apertures include a plurality of round apertures 31, and a plurality of oblong apertures 32. The round apertures 31 are used primarily for securing pipe flanges to the face plate, and the oblong apertures are used for securing a pipe to the face plate for rotation therewith.

The face plate includes a center plate 33, having a hole at the center for receiving the threaded end of the shaft 2. The center 33 is spaced from the face plate by spacer plate 29, as shown in Fig. 6. The center 33 is secured to the end of shaft 2 by cap screw 30. The diameter of the center 33 corresponds to the inside diameter of the pipe or flange to be secured to the face plate. When using a machine such as illustrated herein, it is to be understood that a supply or stock of centers 33 would be maintained that would correspond to the range of diameters of pipe and flanges to be worked on by the machine.

Figure 3:
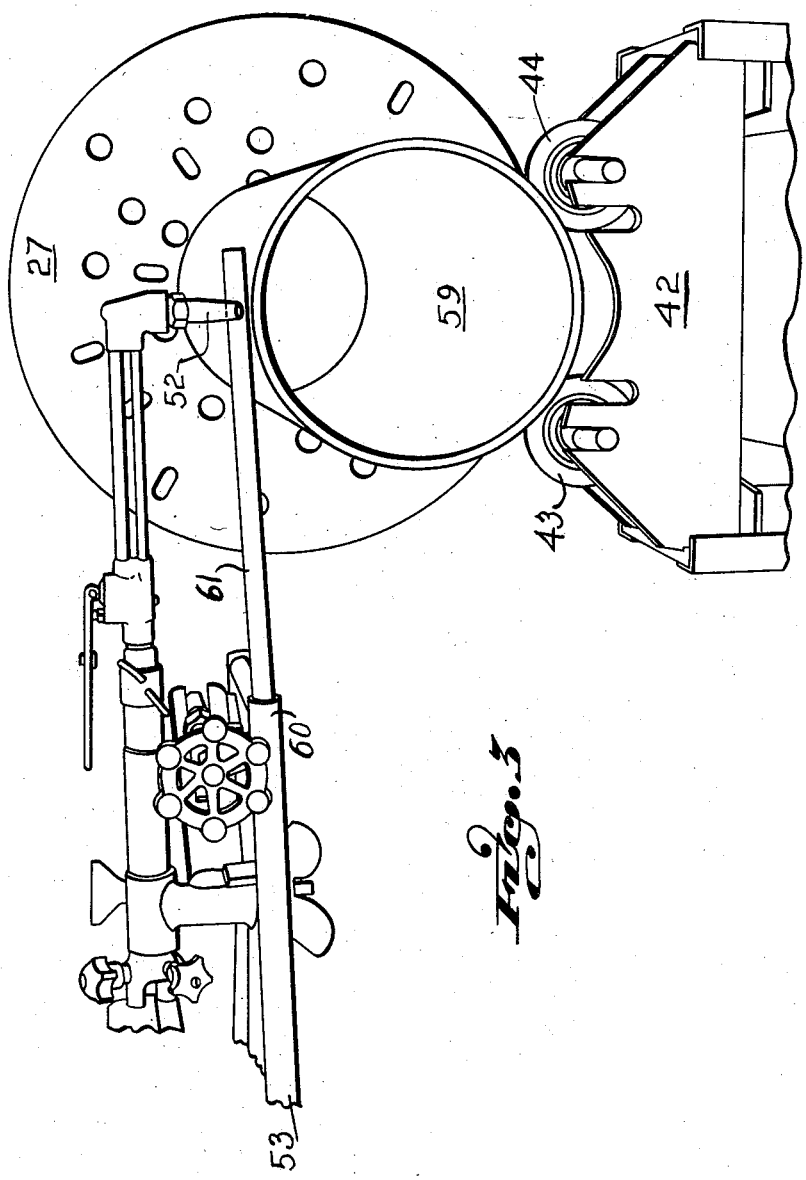
Fig. 3 is a view in perspective, looking at the front of the face plate, showing a pipe attached to the face plate and supported with its longitudinal axis coincident with the axis of rotation of the face plate.
Figure 4:
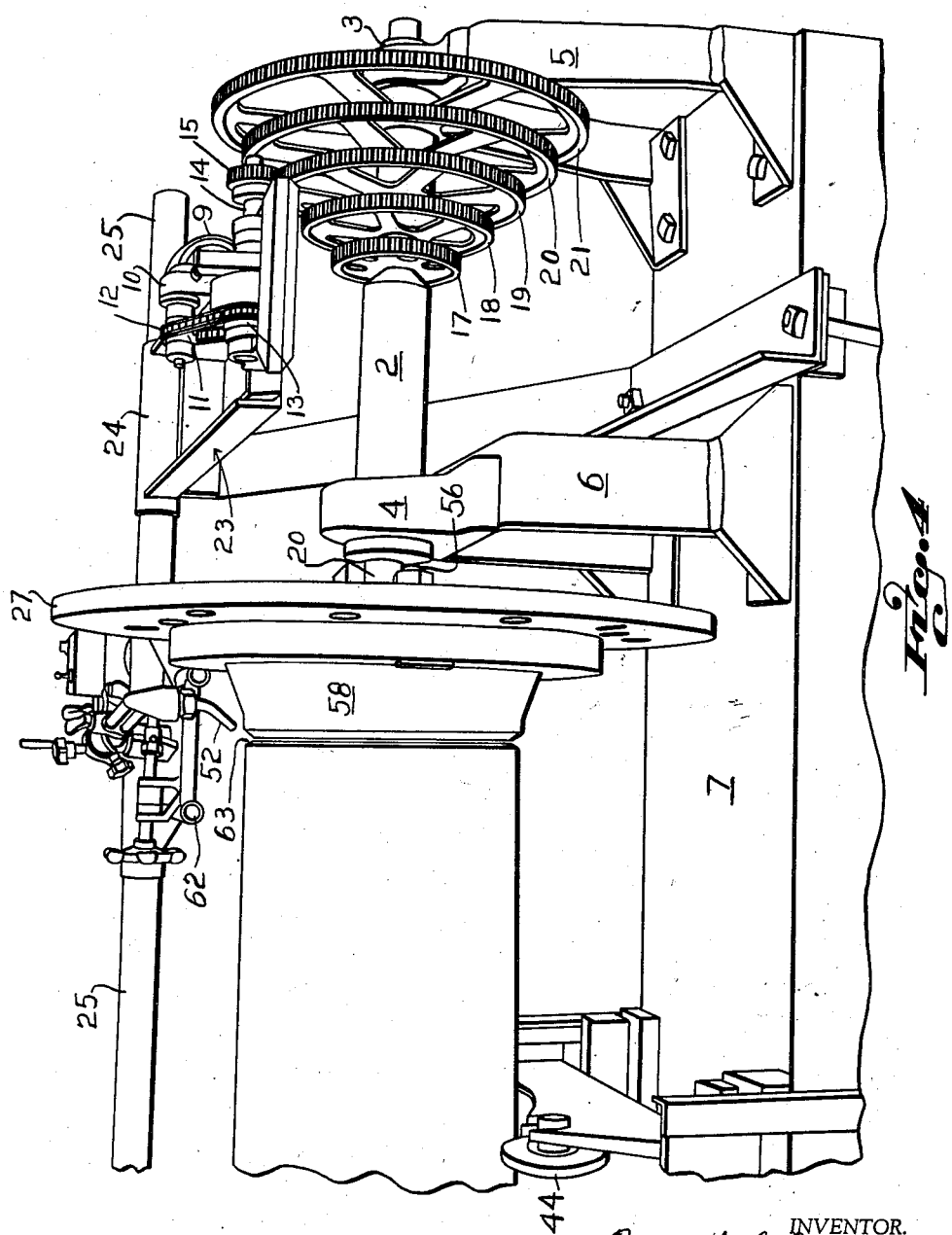
Fig. 4 is a view in side elevation, and partly in perspective, of the machine, showing a pipe flange mounted on the face plate and a pipe supported adjacent the pipe flange in position to be welded while being rotated by the machine.
Figure 5:
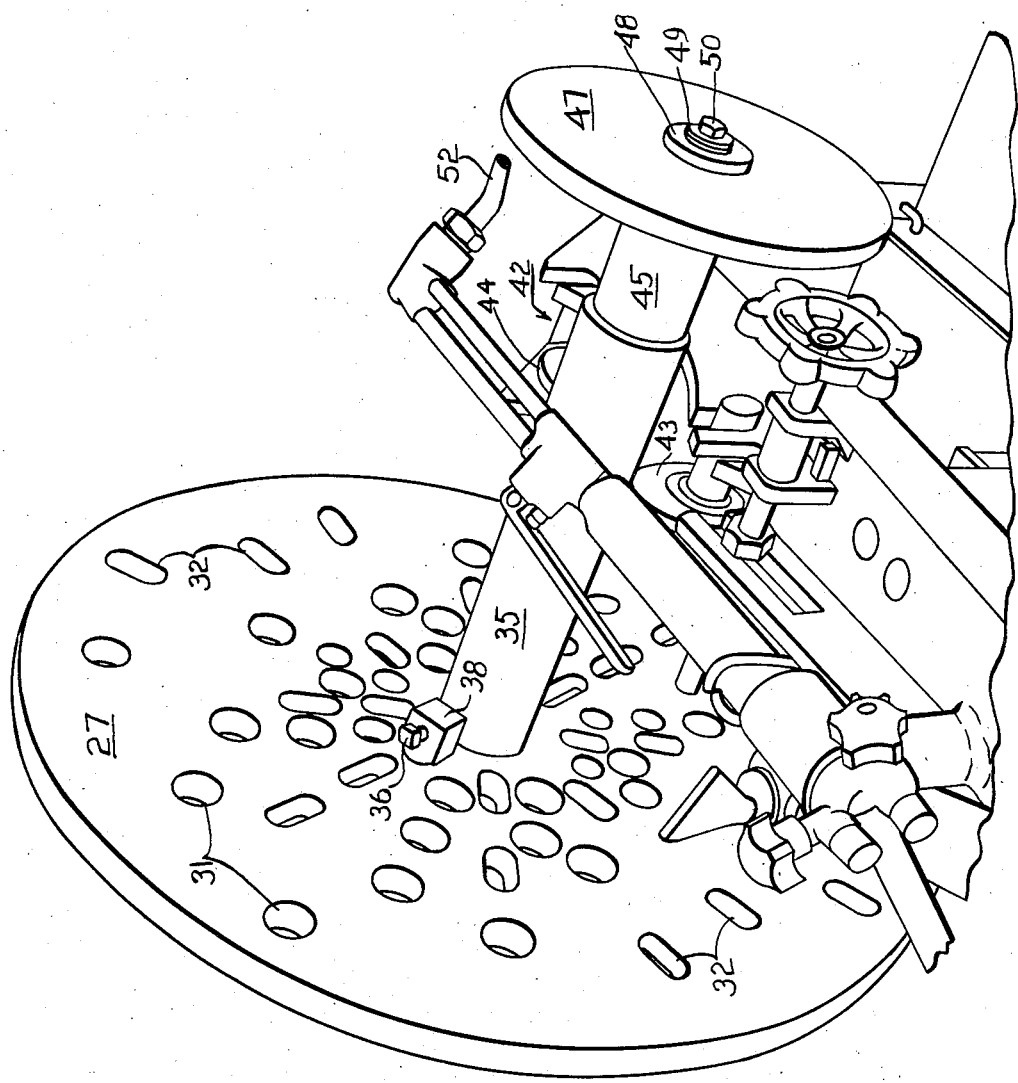
Fig. 5 is a view in perspective of the machine shown in Figs. 1, 3 and 4, set up for the cutting of centers for pipe and pipe flanges that are secured to the face plate.

The center 33, secured as in Fig. 6, is also secured in the same manner to the face plate in Figs. 1, 3 and 4, but is not visible. Fig. 5 illustrates an adaptation of the machine for making centers 33 on the job site.

To prepare a center 33 on the machine, a piece of pipe 35 is secured to the face plate 27 in the same fashion that a pipe is shown secured to the face plate in Fig. 6. The pipe 35 may be one and one-half or two inches in diameter, in which case the diameter of the center 33 selected and secured to the face plate 27, would be equal to the internal diameter of the pipe 35. The end of the pipe abutting the face plate is slipped over the selected center and secured in place by screws 36, which are threaded through lugs 37.

The lugs 37, as shown in Fig. 7, are provided with a relatively square head 38, through which the screws 36 are threaded, and an oblong shank 39, that is passed through one of the oblong holes 32. The oblong holes selected for the lugs 37, as stated previously herein, would be on a diameter of the face plate. The lugs are secured to the face plate by means of key wedges 40 that are driven through oblong holes 41 in the shanks 39, and against the rear face of the face plate 27. The screws 36 are then turned in against the pipe 35, to secure it to the face plate. The portion of pipe 35 extending outwardly from the face plate, is supported in a cradle 42 having spaced rollers 43 and 44 thereon. The spacing of rollers 43 and 44, and the elevation of them on the frame of the machine, are such that pipe 35 will be held accurately with the longitudinal axis thereof coinciding with the center of rotation of the face plate 27. The forward end of pipe 35 is provided with a telescoping member 45. The outer end of member 45 is reduced in diameter to receive a piece of plate 47 having a hole at the center, is placed, and secured to it by means of a disk 48, washers 49, and a cap screw 50, screwed into the end of member 45. Thus, the plate from which a center 33 is to be made is secured to the outer end of member 45.

If it is required to have a center 33 of three inches diameter, a circle of three-inch diameter is scribed on the back face of the plate. A welding torch is then mounted in place with the torch tip 52 thereof behind the plate, as shown in Fig. 5. When the flame has been located on the circle scribed on the back of the plate, the face plate 27 is rotated by the motor drive means 8 at a speed that will result in cutting of the disk 33 to the diameter required.

In Fig. 1 of the drawings, the mounting 53 for the cutting torch and tip 52, including the valves therefor, is shown. As shown, the cutting torch assembly is provided with a sleeve 54, that receives the tubular member 25. The cutting torch assembly may be moved along the tubular member 25 to the desired position. The cutting torch assembly is counter-balanced, so that the torch tip 52 will be located at the proper distance from the outside wall of the pipe.

In Fig. 1, the torch tip 52 is positioned at an angle corresponding to the angle of the bevel to be cut in a pipe flange. In the set-up there illustrated, the machine is used to reclaim a pipe flange 55. The pipe flange is centered on the face plate 27 by means of a center 33, located within the same and corresponding to the internal diameter thereof, and secured to the face plate by a pair of diametrically-opposed bolts 56 having relatively thin, flat heads 57. The bolts 56 pass through thin washers 58, the pipe flange and circular holes or apertures 31 in the face plate 27 corresponding to the bolt hole circle diameter of the flange. The motor drive means 8 for the shaft 2 is then started, and the face plate 27 and the flange are rotated at the proper speed. The torch mechanism in such case is mounted in the proper place and the torch tip placed at the bevel angle, as shown in Fig. 1. The torch tip 52 is so positioned that the flame will cut the pipe portion of the pipe flange on a bevel, the angle of which corresponds to specifications, and preferably along the original fusion line of the weld between the original piece of pipe to be removed, and the flange. The pipe flange shown in Fig. 1 is in finished condition after reclamation.

In Fig. 3 is illustrated a setup of the machine for the preparation of a bevel on a pipe 59. The pipe 59 is secured to the face plate 27, as shown and described supra. The portion of the pipe extending forwardly of the face plate 27 is supported on the rollers 43 and 44, which have been so adjusted for spacing and height that the longitudinal axis of the pipe will coincide with the center of rotation of the face plate 27. The torch mechanism is then moved to the end of the pipe, and the torch tip set at the proper angle for cutting and forming the bevel.

If it is desired to cut a piece of pipe to a given length, the pipe would be mounted as in Fig. 3 and the torch set to the line indicating the length of the pipe after cutting. The flame is then impinged on the pipe at the line of cut and the pipe rotated as above described, until the torch has cut the pipe through.

As stated supra, the torch mechanism is counter-balanced so that the tip 52 will be maintained at a given spacing from the outside pipe wall. It is known that pipe sections are not always perfectly round, and therefore, even though when the center of the pipe is aligned with the center of rotation of the face plate 27, the pipe wall, at a given point, will not transcribe a perfectly round circle about the axis of the pipe. In such a case, the required spacing of the torch tip 52 from the pipe wall may be maintained constant by inserting a rod 61 in a socket 62 in the torch frame. The length of the rod is such that it rides on top of the pipe, as shown in Fig. 3. Thus, if there are irregularities in the roundness of the pipe, the rod will raise and lower the torch tip 52 to maintain the spacing constant.

Fig. 4 illustrates how a reclaimed pipe flange and a pipe having a beveled end may be welded. The pipe is supported on the cradle rollers 43 and 44, and its beveled end is placed in alignment with the bevel on the pipe flange. The pipe is then tacked by spot welding at a number of points around the periphery of the joint, thereby securing the pipe to the flange. When the pipe and flange have been tacked, they are adjusted for alignment, so that the flange will be square with the pipe. When the tacking and squaring has been performed, weld metal may be deposited in the V groove formed by the two bevels of the pipe and the flange. The weld metal is deposited preferably by arc welding. The arc welder welds the pipe by depositing the weld metal in the groove formed by the beveled edges, as the face plate 27 is rotated. Since the pipe and the flange have been tacked prior to the welding operation, the pipe and the flange rotate together at a uniform speed.

By forming the bevel on the flange and on the pipe, as shown, and in accordance with the invention, the bevels are accurate and uniform. Therefore, the small gap or space 63 between the inside of the bevels on the pipe and the flange will be uniform, so that a uniform amount of weld metal is deposited around the entire joint. Therefore, there will not be more metal in one spot than another, so that when the weld has been completed, there will be no tendency for the pipe to warp at the welded joint. A warping takes place when there is an appreciably greater amount of weld metal in one location of a joint, than there is in another location. Where the greater amount of weld metal is deposited, there will be a greater length of joint, and therefore, on cooling, there will be greater contraction at that point, and warping of the pipe with respect to the flange, results.

The machine illustrated may also be used to reclaim elbows. Figs. 8 and 9 illustrate how an elbow 64 may be reclaimed. In Fig. 8, elbow 64 is shown as having ragged portions 65 and 66 at each end. These portions represent the remaining parts of pipes that have previously been cut off from the elbow. To reclaim an elbow, a short piece of pipe 67 is tacked on one end of the elbow, and secured to the face plate 27, as shown. One leg of the elbow is supported on the cradle rolls 43 and 44. When the elbow has been mounted, as shown in Fig. 8, and made square so that the elbow makes a right angle with the short piece of pipe 67, the face plate is rotated by driving shaft 2. As the face plate rotates, the cutting torch tip 52 is placed at an angle illustrated in Fig. 8, and the flame caused to impinge, preferably at the old line of fusion and at the angle corresponding to the required bevel.

As the elbow and pipe 67 are rotated by the face plate 27, the elbow is cut and beveled at the line of fusion, or as close thereto as possible. When the elbow has been severed and beveled on the line of fusion, the elbow and the piece of pipe 67 are removed from the machine. Then, the elbow is turned, end for end, and a short piece of pipe 68 is tacked onto the unfinished leg of the elbow and secured to the face plate 27, as shown in Fig. 8. After the elbow has been squared with the piece of pipe 68, the face plate 27, the pipe 68 and the elbow are rotated as before, and the cutting torch tip 52 directed at the angle of the bevel on the elbow, preferably at the line of fusion of the previous weld. When the elbow has been severed from the short piece of pipe, both ends of the elbow will have been reclaimed and beveled to standard.

In Fig. 9, a reclaimed elbow is shown in position to be welded to a piece of pipe 70 of any desired length. The elbow is tacked to the beveled end of the pipe and made square therewith. When it has been made square, an electric arc welder may be used to deposit the weld metal in the V groove formed by the adjacent beveled ends.

The drive means 8 for shaft 2 is of such construction that, when an elbow is being reclaimed as in Fig. 8, or being welded to a piece of pipe as in Fig. 9, the unbalance of the elbow will not cause the machine to turn at an uneven rotational speed. However, if the elbow is extremely heavy, a counterweight 69 may be attached to the elbow so as to balance the off-center weight thereof.

A machine such as shown and described herein, may be used at the site of the installation of welded pipe systems. Pipes may be cut to length by attaching them to the face plate 27 and supporting them on the cradle rolls 43 and 44 by means of a torch flame. Since no cutting tool is applied to the pipe or the flanges, the power required to turn the face plate 27, and the flanges or the pipe attached thereto, is very small or nominal. Since a cutting tool does not touch the metal, there is no vibration in the machine.

It is possible to cut and bevel pipe and flanges made of alloy steel, such as stainless steel, that are hard and difficult to cut and machine in a lathe by using an abrasive wheel in lieu of the cutting torch. In Figs. 10 and 11 is illustrated a set-up whereby an alloy steel pipe may be cut with an abrasive wheel. As there illustrated, the torch tip 52 and the controls therefor are removed from the support frame 53, and a motor-driven abrasive wheel unit 70 is substituted therefor. The unit 70 comprises a base 71, having spaced rods 72 thereon, that are received in the sockets 62 of frame 53. The unit also includes a motor 73, having an abrasive wheel 74 mounted on the motor shaft 75.

As shown in Fig. 11, the abrasive wheel 74 has a beveled edge 76, the bevel of which is such as to provide the proper or desired bevel on the end of the pipe 77, cut thereby. The pipe, as shown, is secured to the face plate 27 in the same manner that a pipe is shown secured to the face plate in Fig. 6.

The unit 70 may be turned end for end, and supported in the sockets 62 in cases where it is necessary to have the abrasive wheel 74 located relatively close to the face plate. In order that the unit may be reversed end for end, the rods 72 are slidably mounted in sockets 78 on the under side of the base 71. The rods 72 may be secured in the sockets in any suitable manner, as required.

From the above description and the drawings, several uses of the machine are disclosed. Other uses will be evident to those of ordinary skill in the art to which the invention pertains.

The machine, as constructed, supports flanges against the face of the face plate in such a position that the torches do not play a flame of intense heat on any permanent working part of the machine. The same applies to pipe which is cut or beveled in the machine. For example, as illustrated in the drawings, the lugs 38 which carry the screws 36 for securing a pipe to the face plate may be damaged by the intense heat of the torch flame, but as these parts are inexpensive and may be carried as stock at the machine, any of them that are damaged can be thrown away and replaced by undamaged pieces. Likewise, as will be apparent from Fig. 4, the torch flame is directed away from the flange and the bolts that secure the flange to the face plate. Even if the heads of these bolts are accidentally damaged by the heat of the torch, they can be replaced with new ones. The face plate itself, as well as the shaft 2 and its bearings, are not exposed to the flame, and are therefore not subject to injury.

The centers 33, which are used to support flanges and pipe on center with the axis of rotation of the face plate 27, likewise are inexpensive pieces, and may be made on the machine as and when needed, to the proper size. If these, by any chance, are damaged by the heat of the torch, they can be replaced at little cost and labor.

Having thus described the invention, it will be apparent to those skilled in this art that various modifications and changes may be made in the illustrated embodiments, without departing from either the spirit or the scope of the invention.

Therefore, what is claimed as new and desired to be secured by Letters Patent is:

1. A machine for rotatably supporting a work piece, such as pipe, while cutting the same with torch heat, comprising a shaft adapted to be driven by a motor, bearings for rotatably supporting the shaft, one end of the shaft being outboard of the adjacent bearing, a face plate on the shaft, a center plate secured to the center of the shaft on the face of the face plate, adapted to extend into the work piece and center the same on the face plate and the shaft, said face plate being provided with a plurality of pairs of diametrically-opposed apertures distributed over the face of the face plate for receiving a plurality of means for securing the pipe to the center plate for rotation with the face plate, said apertures being so arranged that a wide range of diameters of pipe may be secured to the face plate, each of said securing means comprising a lug having a head disposed to engage the face of the face plate, a shank extending through its aperture to the rear of the face plate, the end of said shank having an elongated slot, a wedge in said slot provided with a straight edge disposed to engage the rear face of the face plate and with a tapered edge for engaging the outer end of said slot to secure the head firmly against the face of said face plate, the head of said lug having a threaded bolt hole to receive a bolt for engaging the exterior of the pipe at a location over the edge of said center plate.

2. A machine for rotatably supporting a work piece, such as pipe, pipe flanges and the like, while cutting the same with torch heat, comprising a shaft adapted to be driven by a motor, bearings for rotatably supporting the shaft, one end of the shaft being outboard of the adjacent bearing, a face plate on the outboard end of the shaft, a center plate adapted to extend into the work piece for centering the same on the face plate and the shaft, said face plate being provided with a plurality of apertures so spaced from the center thereof that the location of any pair of apertures will lie on the bolt hole circle of a pipe flange and that the apertures will accommodate a range of bolt hole circles varying in diameter from a minimum center diameter to the maximum diameter of the face plate, said face plate being provided with shouldered lugs that extend through pairs of apertures with the shoulders abutting the front face of the face plate, and wedge means at the rear face of the face plate for securing said lugs thereto, the portion of the lugs at the front of the face plate being provided with means for exerting inwardly directed radial clamping pressure on a work piece to cause it to rotate with the face and center plates.

3. A machine for rotatably supporting a plate, such while cutting the same with a torch, comprising a shaft adapted to be driven by a motor, bearings for rotatably supporting the shaft, one end of the shaft being outboard of the adjacent bearing, a face plate on the outboard end of the shaft, a center plate secured to the face plate for receiving and centering a hollow member on the face plate and shaft, said face plate being provided with a plurality of apertures so spaced from the center thereof that the location of any pair of apertures will lie on the bolt hole circle of a pipe flange and that the apertures will accommodate a range of bolt hole circles varying in diameter from a minimum center diameter to the maximum diameter of the face plate, said hollow member having one end extending over and supported by said center plate and supported inboard of its other end on a roller support, said hollow member adapted to support a plate on its outboard end, and torch means for cutting said plate to a predetermnied diameter as the same is rotated to form a center plate for attachment to the face plate.

References Cited in the file of this patent

UNITED STATES PATENTS

| | | |
|---|---|---|
| 334,538 | Muncaster | Jan. 19, 1886 |
| 1,072,436 | Dicks | Sept. 9, 1913 |
| 1,150,974 | Sollis et al. | Aug. 24, 1915 |
| 1,634,057 | Taylor | June 28, 1927 |
| 1,751,766 | Smith | Mar. 25, 1930 |
| 1,963,537 | Tweit | June 19, 1934 |
| 2,208,879 | Blazek et al. | July 23, 1940 |
| 2,295,182 | Norton | Sept. 8, 1942 |
| 2,383,607 | Lovers et al. | Aug. 28, 1945 |
| 2,384,128 | Nation | Sept. 4, 1945 |

FOREIGN PATENTS

| | | |
|---|---|---|
| 567,699 | Great Britain | Feb. 27, 1945 |